(12) United States Patent
Colombo et al.

(10) Patent No.: US 9,156,506 B2
(45) Date of Patent: Oct. 13, 2015

(54) ELASTICALLY AVERAGED ALIGNMENT SYSTEM

(71) Applicant: GM Global Technology Operations LLC, Detroit, MI (US)

(72) Inventors: Joel Colombo, Howell, MI (US); Steven E. Morris, Fair Haven, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/851,222

(22) Filed: Mar. 27, 2013

(65) Prior Publication Data

US 2014/0292013 A1 Oct. 2, 2014

(51) Int. Cl.
*B62D 27/04* (2006.01)

(52) U.S. Cl.
CPC ........... *B62D 27/04* (2013.01); *Y10T 29/49826* (2015.01)

(58) Field of Classification Search
CPC ..................................................... B62D 27/04
USPC ............... 296/29, 187.01, 191; 403/280, 282, 403/408.1; 29/450, 525.05, 525.01
See application file for complete search history.

(56) References Cited

U.S. PATENT DOCUMENTS

| | | |
|---|---|---|
| 1,301,302 A | 4/1919 | Nolan |
| 1,819,126 A | 8/1931 | Scheibe |
| 1,982,076 A | 11/1934 | Spahn |
| 2,006,525 A | 7/1935 | Thal |
| 2,482,488 A | 9/1949 | Franc |
| 2,688,894 A | 9/1954 | Modrey |
| 2,778,399 A | 1/1957 | Mroz |
| 2,780,128 A | 2/1957 | Rapata |

(Continued)

FOREIGN PATENT DOCUMENTS

| | | |
|---|---|---|
| CN | 1129162 A | 8/1996 |
| CN | 1328521 A | 12/2001 |

(Continued)

OTHER PUBLICATIONS

Balasubramaniam, M., Golaski, E., Son, S., Sriram, K., Slocum, A. "An Ant-Backlash 2 Part Shaft Coupling with Interlocking Elastically Averaged Teeth", Precis. Eng., vol. 26 No. 3, pp. 314-330, 2002.*

(Continued)

*Primary Examiner* — Dennis H Pedder
(74) *Attorney, Agent, or Firm* — Cantor Colburn LLP

(57) ABSTRACT

An elastically averaged alignment system includes a first alignment portion comprising an alignment member and a first plurality of elastically deformable alignment elements. The alignment system also includes a second alignment portion comprising an elastically deformable alignment member configured and disposed to be received by and deformably and matingly engaged with the alignment member and a second plurality of elastically deformable alignment elements configured and disposed to deformably and matingly engage the first plurality of deformable alignment elements, wherein the engagement of the alignment member and deformable member and first plurality of elastically deformable alignment elements and the second plurality of elastically deformable alignment elements elastically average a predetermined position of the second alignment portion relative to the first alignment portion.

6 Claims, 7 Drawing Sheets

(56) References Cited

U.S. PATENT DOCUMENTS

| | | |
|---|---|---|
| 2,862,040 A | 11/1958 | Curran |
| 2,902,902 A | 9/1959 | Slone |
| 3,005,282 A | 10/1961 | Christiansen |
| 3,014,563 A | 12/1961 | Bratton |
| 3,087,352 A | 4/1963 | Daniel |
| 3,130,512 A | 4/1964 | Van Buren, Jr. |
| 3,168,961 A | 2/1965 | Yates |
| 3,169,004 A | 2/1965 | Rapata |
| 3,194,292 A | 7/1965 | Borowsky |
| 3,213,189 A | 10/1965 | Mitchell et al. |
| 3,233,358 A | 2/1966 | Dehm |
| 3,233,503 A | 2/1966 | Birger |
| 3,244,057 A | 4/1966 | Mathison |
| 3,531,850 A | 10/1970 | Durand |
| 3,643,968 A | 2/1972 | Horvath |
| 3,680,272 A | 8/1972 | Meyer |
| 3,842,565 A | 10/1974 | Brown et al. |
| 3,895,408 A | 7/1975 | Leingang |
| 3,905,570 A | 9/1975 | Nieuwveld |
| 4,158,511 A | 6/1979 | Herbenar |
| 4,213,675 A | 7/1980 | Pilhall |
| 4,394,853 A | 7/1983 | Lopez-Crevillen et al. |
| 4,406,033 A | 9/1983 | Chisholm et al. |
| 4,481,160 A | 11/1984 | Bree |
| 4,575,060 A | 3/1986 | Kitagawa |
| 4,605,575 A | 8/1986 | Auld et al. |
| 4,767,647 A | 8/1988 | Bree |
| 4,805,272 A | 2/1989 | Yamaguchi |
| 4,817,999 A | 4/1989 | Drew |
| 4,819,983 A | 4/1989 | Alexander et al. |
| 4,973,212 A | 11/1990 | Jacobs |
| 5,139,285 A | 8/1992 | Lasinski |
| 5,154,479 A | 10/1992 | Sautter, Jr. |
| 5,208,507 A | 5/1993 | Jung |
| 5,234,122 A | 8/1993 | Cherng |
| 5,297,322 A | 3/1994 | Kraus |
| 5,342,139 A | 8/1994 | Hoffman |
| 5,397,206 A | 3/1995 | Sihon |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,577,301 A | 11/1996 | Demaagd |
| 5,577,779 A | 11/1996 | Dangel |
| 5,580,204 A | 12/1996 | Hultman |
| 5,601,453 A | 2/1997 | Horchler |
| 5,634,757 A | 6/1997 | Schanz |
| 5,667,271 A | 9/1997 | Booth |
| 5,698,276 A | 12/1997 | Mirabitur |
| 5,736,221 A | 4/1998 | Hardigg et al. |
| 5,795,118 A | 8/1998 | Osada et al. |
| 5,806,915 A | 9/1998 | Takabatake |
| 5,810,535 A | 9/1998 | Fleckenstein et al. |
| 5,941,673 A | 8/1999 | Hayakawa et al. |
| 6,073,315 A | 6/2000 | Rasmussen |
| 6,193,430 B1 | 2/2001 | Culpepper et al. |
| 6,209,175 B1 | 4/2001 | Gershenson |
| 6,209,178 B1 | 4/2001 | Wiese et al. |
| 6,264,869 B1 | 7/2001 | Notarpietro et al. |
| 6,299,478 B1 | 10/2001 | Jones et al. |
| 6,321,495 B1 | 11/2001 | Oami |
| 6,349,904 B1 | 2/2002 | Polad |
| 6,354,815 B1 | 3/2002 | Svihla et al. |
| 6,378,931 B1 | 4/2002 | Kolluri et al. |
| 6,398,449 B1 * | 6/2002 | Loh ................. 403/280 |
| 6,484,370 B2 | 11/2002 | Kanie et al. |
| 6,485,241 B1 | 11/2002 | Oxford |
| 6,533,391 B1 | 3/2003 | Pan |
| 6,543,979 B2 | 4/2003 | Iwatsuki |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,664,470 B2 | 12/2003 | Nagamoto |
| 6,677,065 B2 | 1/2004 | Blauer |
| 6,712,329 B2 | 3/2004 | Ishigami et al. |
| 6,840,969 B2 | 1/2005 | Kobayashi et al. |
| 6,857,676 B2 | 2/2005 | Kawaguchi et al. |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,959,954 B2 | 11/2005 | Brandt et al. |
| 6,971,831 B2 | 12/2005 | Fattori et al. |
| 6,997,487 B2 | 2/2006 | Kitzis |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,089,998 B2 | 8/2006 | Crook |
| 7,178,855 B2 | 2/2007 | Catron et al. |
| 7,198,315 B2 | 4/2007 | Cass et al. |
| 7,306,418 B2 | 12/2007 | Kornblum |
| 7,322,500 B2 | 1/2008 | Maierholzner |
| 7,344,056 B2 | 3/2008 | Shelmon et al. |
| 7,435,031 B2 | 10/2008 | Granata |
| 7,454,105 B2 | 11/2008 | Yi |
| 7,487,884 B2 | 2/2009 | Kim |
| 7,557,051 B2 | 7/2009 | Ryu et al. |
| D602,349 S | 10/2009 | Andersson |
| 7,764,853 B2 | 7/2010 | Yi |
| 7,793,998 B2 * | 9/2010 | Matsui et al. ................. 293/154 |
| 7,802,831 B2 | 9/2010 | Isayama et al. |
| 7,828,372 B2 | 11/2010 | Ellison |
| 7,862,272 B2 | 1/2011 | Nakajima |
| 7,883,137 B2 | 2/2011 | Bar |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,261,581 B2 | 9/2012 | Cerruti et al. |
| 8,297,137 B2 | 10/2012 | Dole |
| 8,297,661 B2 | 10/2012 | Proulx et al. |
| 8,444,199 B2 | 5/2013 | Takeuchi et al. |
| 8,695,201 B2 | 4/2014 | Morris |
| 8,833,832 B2 | 9/2014 | Whipps |
| 8,834,058 B2 | 9/2014 | Woicke |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0136617 A1 | 9/2002 | Imahigashi |
| 2003/0080131 A1 | 5/2003 | Fukuo |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0131896 A1 | 7/2004 | Blauer |
| 2004/0139678 A1 | 7/2004 | Pervan |
| 2004/0208728 A1 | 10/2004 | Fattori et al. |
| 2005/0031946 A1 | 2/2005 | Kruger et al. |
| 2005/0244250 A1 | 11/2005 | Okada et al. |
| 2006/0102214 A1 | 5/2006 | Clemons |
| 2006/0110109 A1 | 5/2006 | Yu |
| 2006/0141318 A1 | 6/2006 | MacKinnon et al. |
| 2006/0197356 A1 | 9/2006 | Catron et al. |
| 2006/0249520 A1 | 11/2006 | DeMonte |
| 2007/0126211 A1 | 6/2007 | Moerke et al. |
| 2007/0144659 A1 | 6/2007 | De La Fuente |
| 2007/0292205 A1 | 12/2007 | Duval |
| 2008/0073888 A1 | 3/2008 | Enriquez |
| 2008/0094447 A1 | 4/2008 | Drury et al. |
| 2008/0217796 A1 | 9/2008 | Van Bruggen et al. |
| 2008/0260488 A1 | 10/2008 | Scroggie et al. |
| 2009/0072591 A1 | 3/2009 | Baumgartner |
| 2009/0091156 A1 | 4/2009 | Neubrand |
| 2009/0134652 A1 | 5/2009 | Araki |
| 2009/0174207 A1 | 7/2009 | Lota |
| 2009/0265896 A1 | 10/2009 | Beak |
| 2010/0001539 A1 | 1/2010 | Kikuchi et al. |
| 2010/0021267 A1 | 1/2010 | Nitsche |
| 2010/0102538 A1 | 4/2010 | Paxton et al. |
| 2010/0270745 A1 | 10/2010 | Hurlbert et al. |
| 2011/0076588 A1 | 3/2011 | Yamaura |

(56) References Cited

U.S. PATENT DOCUMENTS

| | | |
|---|---|---|
| 2011/0175376 A1 | 7/2011 | Whitens et al. |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0115010 A1 | 5/2012 | Smith et al. |
| 2012/0251226 A1 | 10/2012 | Liu et al. |
| 2012/0261951 A1 | 10/2012 | Mildner et al. |
| 2013/0019454 A1 | 1/2013 | Colombo et al. |
| 2013/0019455 A1 | 1/2013 | Morris |
| 2013/0071181 A1 | 3/2013 | Herzinger et al. |
| 2013/0157015 A1 | 6/2013 | Morris |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris et al. |
| 2014/0159412 A1 | 6/2014 | Morris et al. |
| 2014/0208561 A1 | 7/2014 | Colombo et al. |
| 2014/0208572 A1 | 7/2014 | Colombo et al. |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |

FOREIGN PATENT DOCUMENTS

| | | |
|---|---|---|
| CN | 1670986 A | 9/2005 |
| CN | 100573975 C | 9/2005 |
| CN | 1771399 A | 5/2006 |
| CN | 2888807 Y | 4/2007 |
| CN | 2915389 Y | 6/2007 |
| CN | 101250964 A | 4/2008 |
| CN | 201268336 Y | 7/2009 |
| CN | 201703439 U | 1/2011 |
| CN | 201737062 U | 2/2011 |
| CN | 201792722 U | 4/2011 |
| CN | 202079532 U | 12/2011 |
| DE | 3704190 | 12/1987 |
| DE | 3711696 A1 | 10/1988 |
| DE | 3805693 | 2/1989 |
| DE | 69600357 T2 | 12/1998 |
| DE | 10234253 B3 | 4/2004 |
| DE | 102008005618 A1 | 7/2009 |
| DE | 102010028323 A1 | 11/2011 |
| DE | 102011050003 A1 | 10/2012 |
| EP | 0118796 | 9/1984 |
| EP | 1132263 A1 | 9/2001 |
| EP | 1273766 A1 | 1/2003 |
| EP | 1293384 A2 | 3/2003 |
| EP | 2450259 A1 | 5/2012 |
| EP | 2458454 A1 | 5/2012 |
| JP | 2001171554 A | 6/2001 |
| JP | 2005268004 | 9/2005 |
| JP | 2006205918 | 8/2006 |
| JP | 2009084844 | 4/2009 |
| WO | 2008140659 A1 | 11/2008 |

OTHER PUBLICATIONS

Cross-sectional view of a prior art infrared welded assembly of BMW, Munich, Germany. Believed on the market since about Jan. 1, 2010.

"Elastic Averaging in Flexture Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

\* cited by examiner

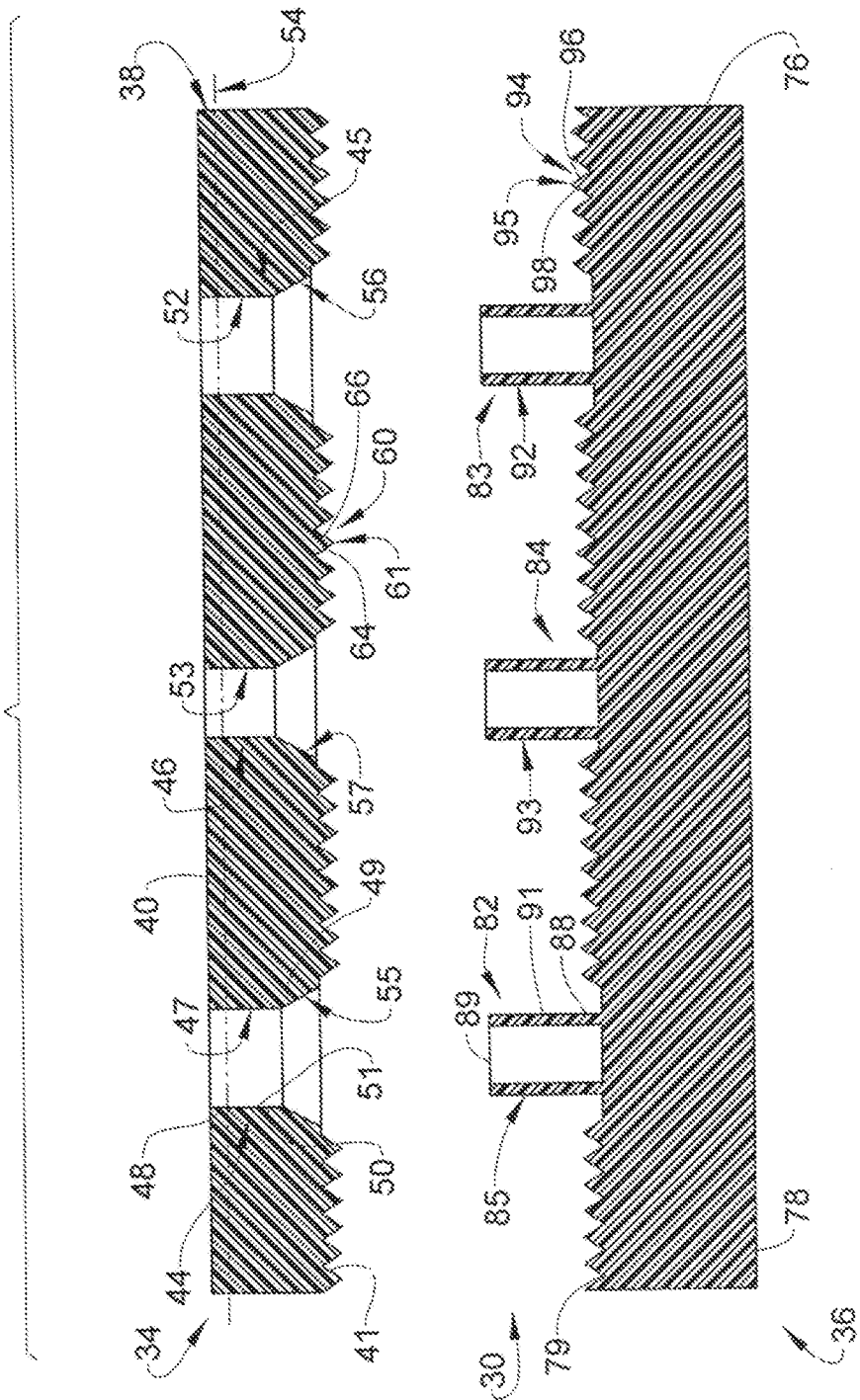

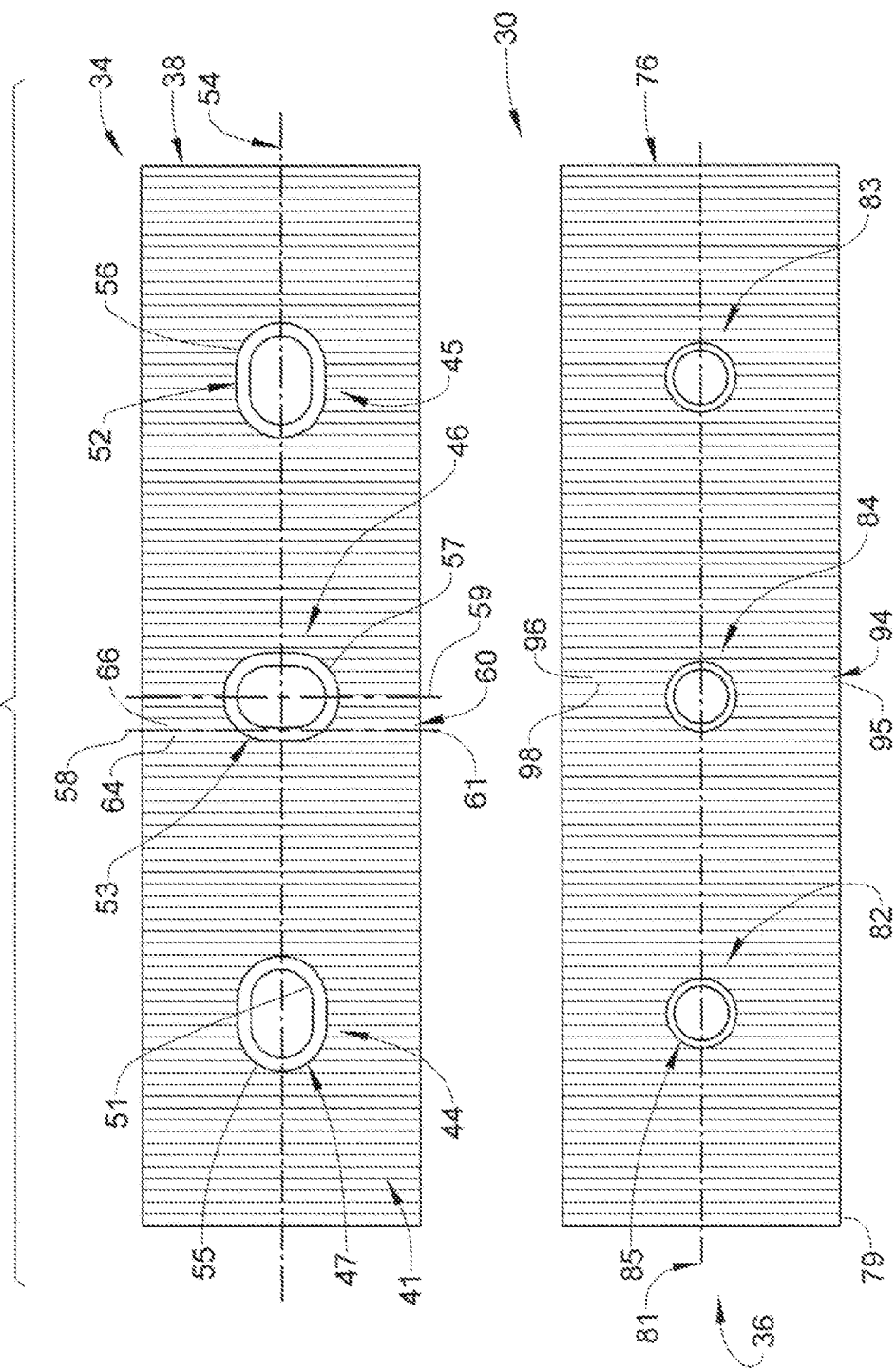

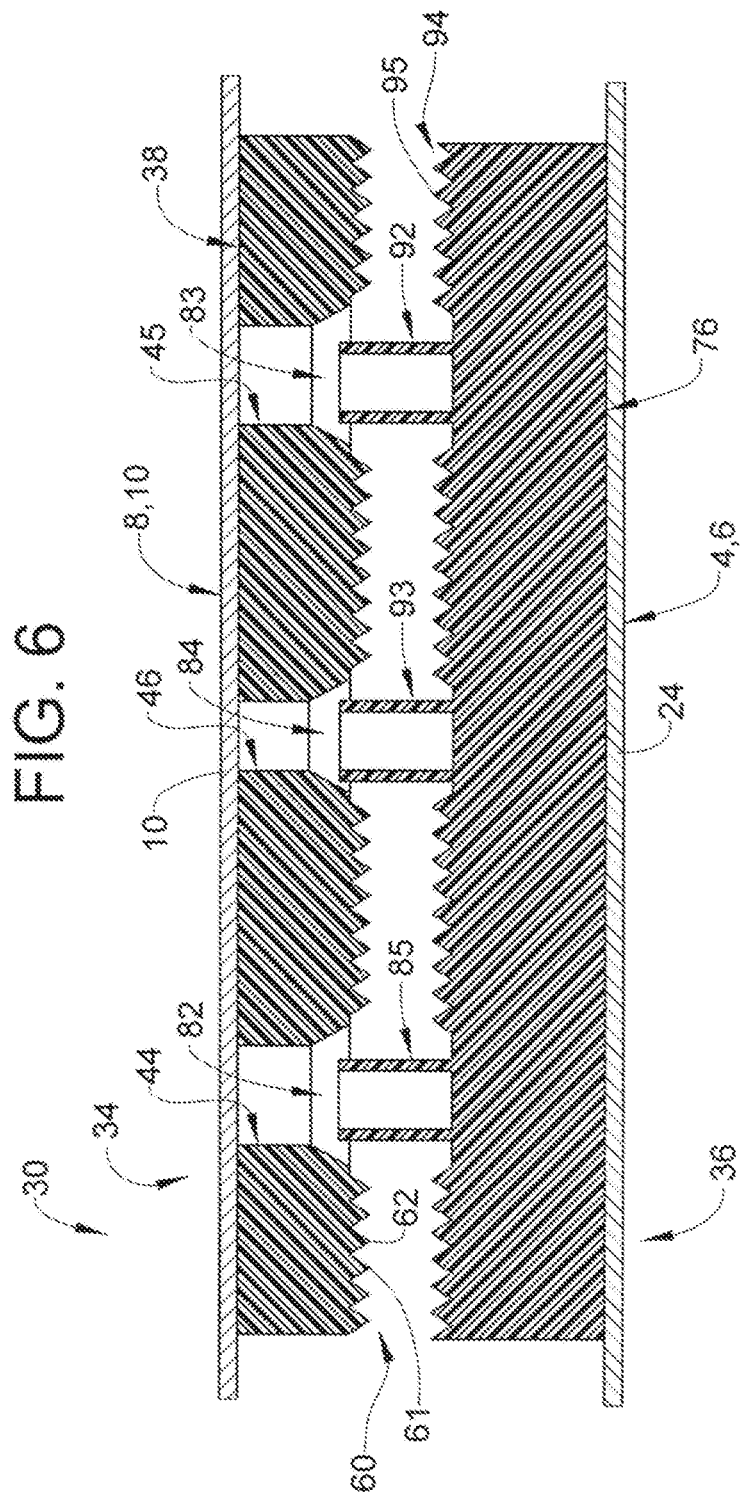

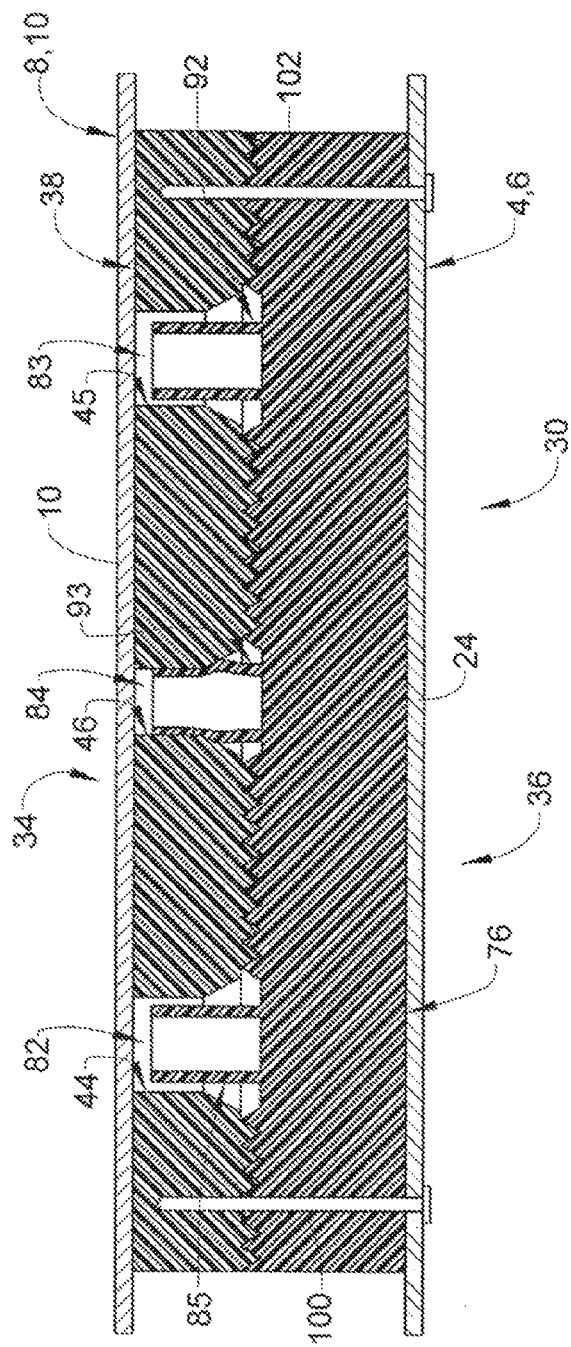
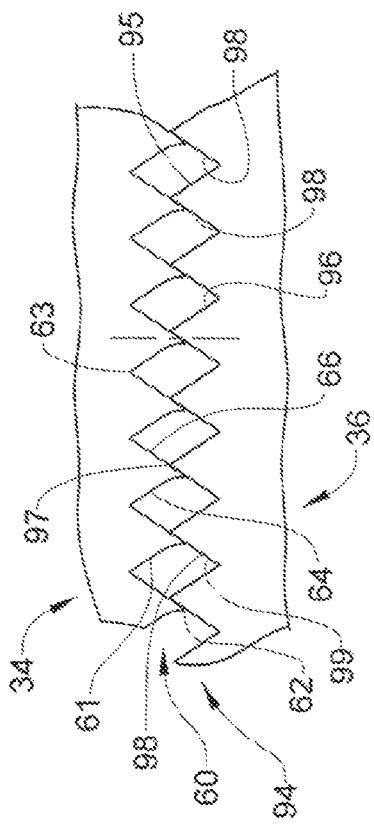

ELASTICALLY AVERAGED ALIGNMENT SYSTEM

FIELD OF THE INVENTION

The subject invention relates to the art of alignment systems and, more particularly, to an elastically averaged alignment system, and even more particularly to an elastically averaged alignment system providing coarse to fine alignment of the components on which it is incorporated.

BACKGROUND

Currently, components, particularly vehicular components such as those found in automotive vehicles, which are to be mated together in a manufacturing process are mutually located with respect to each other by features that are oversized and/or undersized to provide spacing to freely move the components relative to one another to align them. One example includes 2-way and/or 4-way male alignment features, typically upstanding bosses, which are received into corresponding female alignment features, typically apertures in the form of holes or slots. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components which may contribute to the presence of undesirably large variation in their alignment, particularly with regard to the gaps and spacing between them. In the case where these misaligned components are also part of another assembly, such misalignments can also affect the function and/or aesthetic appearance of the entire assembly. Regardless of whether such misalignment is limited to two components or an entire assembly, it can negatively affect function and result in a perception of poor quality.

In addition, it is desirable to ensure precise alignment of two components by providing a precise or fine positioning and alignment system or mechanism; however, it is often necessary, or at least desirable, to obtain a rough or coarse alignment of the components prior to proceeding with the precise alignment. Current two-way and four-way alignment features, such as those described above, do not provide coarse and fine alignment of the respective components on which they are incorporated. As a result, it is desirable to provide alignment systems that provide both coarse and fine alignment of the components on which they are incorporated.

SUMMARY OF THE INVENTION

In accordance with an exemplary embodiment, an elastically averaged alignment system is disclosed. The alignment system includes a first alignment portion comprising an alignment member and a first plurality of elastically deformable alignment elements. The alignment system also includes a second alignment portion comprising an elastically deformable alignment member configured and disposed to be received by and deformably and matingly engaged with the alignment member and a second plurality of elastically deformable alignment elements configured and disposed to deformably and matingly engage the first plurality of deformable alignment elements, wherein the engagement of the alignment member and deformable member and first plurality of elastically deformable alignment elements and the second plurality of elastically deformable alignment elements elastically average a predetermined position of the second alignment portion relative to the first alignment portion.

In accordance with another exemplary embodiment, a method of fastening a first component to a second component includes aligning an alignment member provided on a first alignment portion attached to the first component with an elastically deformable alignment member provided on a second alignment portion attached to the second component. The method also includes engaging the alignment member with the elastically deformable alignment member to establish an elastically averaged first alignment of the first component relative to the second component, the engaging of the alignment member with the elastically deformable alignment member also providing engagement of one or more of a first plurality of elastically deformable alignment elements provided on the first alignment portion with one or more of a second plurality of elastically deformable alignment elements provided in the second alignment portion. The method further includes shifting the first alignment portion relative to the second alignment portion upon engagement and causing an elastic deformation of the elastically deformable alignment members. Still further, the method includes seating the first plurality of elastically deformable alignment elements against the second plurality of elastically deformable alignment elements to establish a second alignment of the first component relative to the second component and an elastically averaged predetermined position of the first component to the second component.

In accordance with yet another exemplary embodiment, a vehicle is disclosed. The vehicle includes a first component and a second component positioned and aligned in an elastically averaged predetermined position relative to the first component. The vehicle also includes an elastically averaged alignment system that establishes the predetermined position of the first component relative to the second component, the elastically averaged alignment system includes a first alignment portion comprising an alignment member and a first plurality of elastically deformable alignment elements disposed on the first body panel. The alignment system also includes a second alignment portion comprising an elastically deformable alignment member configured and disposed to be received by and deformably and matingly engaged with the alignment member and a second plurality of elastically deformable alignment elements configured and disposed to deformably and matingly engage with the first plurality of deformable alignment elements, wherein the engagement of the alignment member and deformable alignment member and the first plurality of elastically deformable alignment elements and the second plurality of elastically deformable alignment elements elastically average a position of the second alignment portion relative to the first alignment portion disposed on the second body panel.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a cross-sectional view of the first and second alignment portions in accordance with an aspect of the exemplary embodiment;

FIG. 4 is a plan view of the first and second alignment portions of FIG. 3;

FIG. 6 is a cross-sectional view illustrating an embodiment of a first alignment portion comprising a plurality of alignment members prior to engagement with a second alignment portion comprising a plurality of elastically deformable alignment members that also illustrates the method of aligning the plurality of alignment members provided on the first alignment portion of the first component with the plurality of elastically deformable alignment members provided on the second alignment portion of the second component;

FIG. 7 is a cross-sectional view of a first alignment portion of a first component comprising a plurality of alignment members and a first plurality of elastically deformable alignment elements seated on a second alignment portion of a second component comprising a plurality of elastically deformable alignment members and a second plurality of elastically deformable alignment elements in an elastically averaged predetermined position of the second alignment portion relative to the first alignment portion that also illustrates the method of alignment including seating the first plurality of elastically deformable alignment elements against the second plurality of elastically deformable alignment elements to establish a second (fine) alignment of the first component relative to the second component and an elastically averaged predetermined position of the first component to the second component; and FIG. 8 is a cross-sectional view illustrating an embodiment of a first alignment portion comprising a plurality of first elastically deformable alignment members engaging a second alignment portion comprising a plurality of second elastically deformable alignment members and the method of providing engagement of one or more of a first plurality of elastically deformable alignment elements provided on the first alignment portion with one or more of a second plurality of elastically deformable alignment elements provided in the second alignment portion and shifting the first alignment portion relative to the second alignment portion upon engagement and causing an elastic deformation of the elastically deformable alignment members.

DESCRIPTION OF THE EMBODIMENTS

Figure 1:
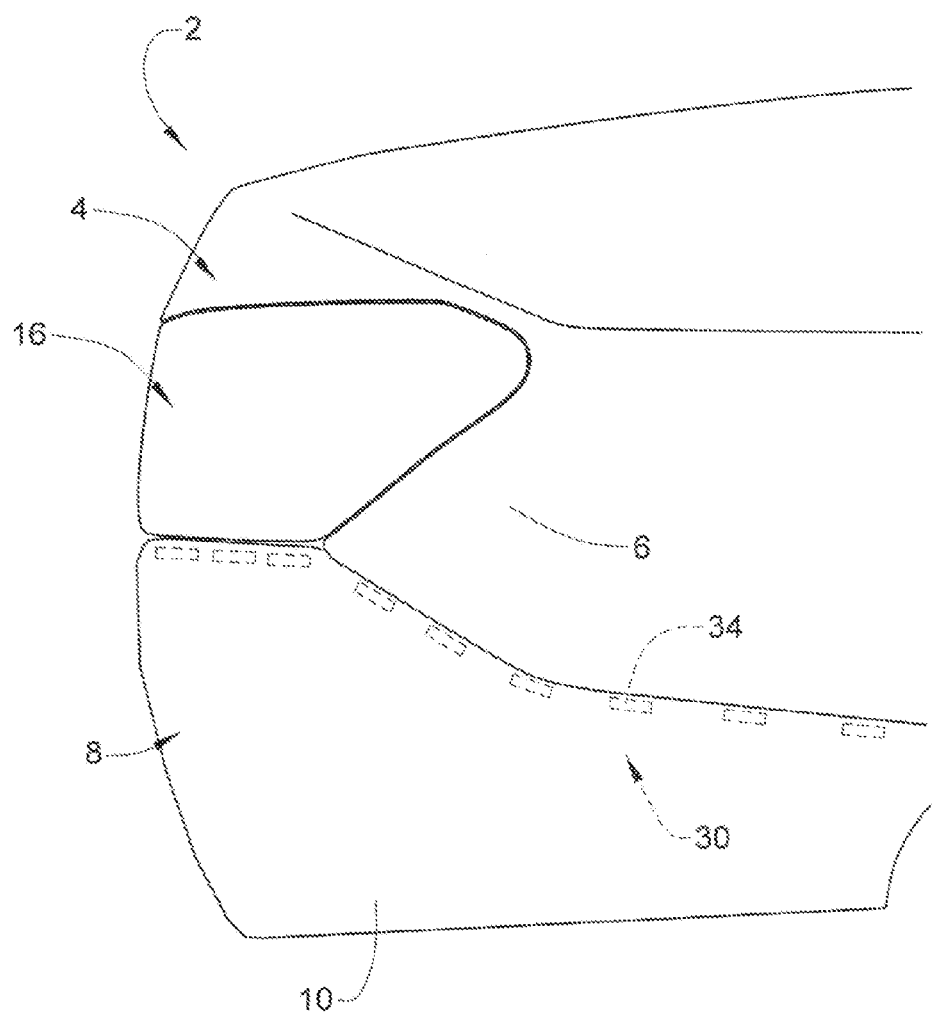
FIG. 1 is a partial side view of a vehicle front end including a first body panel joined to a second body panel with an elastically averaged alignment system having a first alignment portion and a second alignment portion in accordance with an exemplary embodiment.

The following description is merely exemplary in nature and is not intended to limit the present disclosure, its application or uses. For example, the embodiments shown comprise vehicle body panels but the alignment system may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various other interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in certain commonly owned, co-pending U.S. Patent Applications, the disclosure of which is incorporated by reference below in their entirety. The embodiments disclosed herein provide the ability to convert an existing component that is not compatible with the elastic averaging principles described herein to an assembly that does facilitate elastic averaging and the benefits associated therewith.

Figure 2:
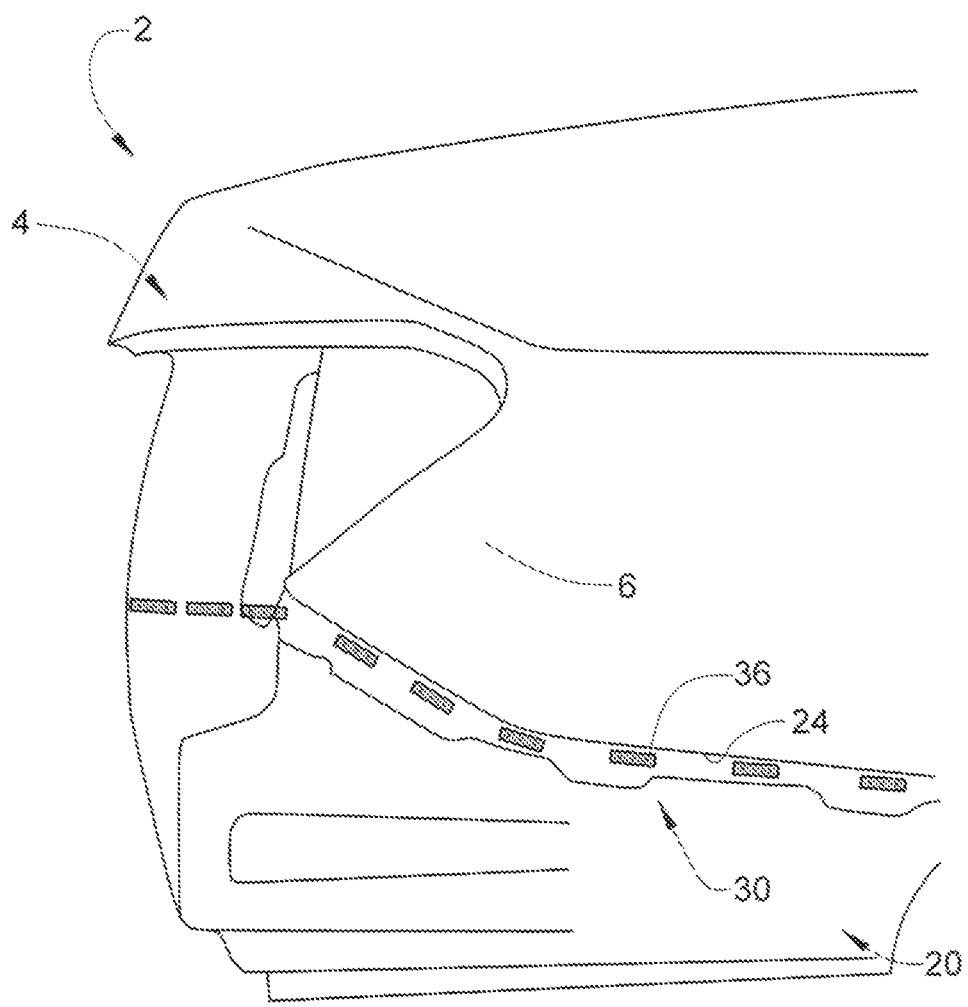
FIG. 2 is a partial view of the vehicle of FIG. 1 with the second body panel removed illustrating the second alignment portion in accordance with an exemplary embodiment.

A vehicle is indicated generally at 2 in FIGS. 1 and 2. The vehicle 2 includes a first component or first body panel 4 and a second component or second body panel 10. In one embodiment, first body panel 4 may comprise a front quarter panel 6 and the second body panel 8 may comprise a front fascia panel 10. Vehicle 2 is also shown to include a light assembly 16 mounted in first body panel 4. First body panel 4 includes a recessed portion 20 that is configured to receive second body panel 8. Recessed portion 20 includes a peripheral flange 24. Second body panel 8 is selectively and controllably positioned in recessed portion 20 through an elastically averaged alignment system 30 associated with the first body panel 4 and second body panel 8. As will be detailed more fully below in FIGS. 3-8, elastically averaged alignment system 30 includes elastically averaging components that facilitate a desired alignment/position of second body panel 8 relative to first body panel 4 to provide a predetermined position of first body panel 4 and second body panel 8, such as a predetermined uniform gap and/or spacing between them. The invention incorporates a coarse-to-fine locating feature comprising a fine, elastically deformable saw tooth pattern that provides precise (fine) fore/aft location of the fascia to fender/quarter panel and a plurality, such as a linear array, of elastically deformable elastic tubes to provide the coarse location fore/aft as well as cross car. The deformability of these location features will allow any positional variations to be averaged out over the entire surface of these components, reducing positional variation of the parts. For example, the alignment system may be used to precisely and repeatably locate plastic fascia to sheet metal fenders or quarter panels and reduce fascia to fender/fascia to quarter panel gap and flushness variations and serve as an assembly aid for the operators who install fascias in the plants to simplify the assembly process.

Referring to FIGS. 1-8, in accordance with an exemplary embodiment, each elastically averaged alignment system 30 includes a first alignment portion 34 and a second alignment portion 36. As shown in FIGS. 1 and 2, in an embodiment, the elastically averaged alignment system 30 includes a plurality of first alignment portions 34 and a corresponding plurality of second alignment portions 36. The first alignment portion 34 and second alignment portion 36 may have any suitable shape, including that of protruding tabs as shown in FIGS. 1-4. As illustrated, for example, in FIGS. 3 and 4, first alignment portion 34 includes a body 38 having a first surface 40 and an opposing second surface 41. First alignment portion 34 further includes a plurality of spaced apart alignment members 44-46. Alignment members 44-46 may be spaced apart in any suitable pattern or arrangement, including as a linear array along longitudinal axis 54 as shown in FIG. 4, for example. The alignment member 44 is shown in the form of an aperture or receiver 47 formed in first alignment portion 34. The receiver 47 extends from a first end portion 48 to a second end portion 49 through an intermediate portion 50. Intermediate portion 50 includes a hollow interior 51. Similarly, the alignment member 45 takes the form of an opening or receiver 52 and the alignment member 46 takes the form of an opening or receiver 53.

Referring to FIGS. 3-8, in accordance with the exemplary embodiment shown, receiver 47 and receiver 52 each include a slot comprising an elongated non-circular (e.g. oval, rounded rectangle, rectangle or the like) cross-section having a major diameter or length (not separately labeled) and a minor diameter or width (also not separately labeled), with the elongated nature owing to the major diameter or length being greater than the minor diameter or width. In one embodiment, the major diameter or length of receivers 47 and 52 extends along a longitudinal axis 54 of first alignment portion 34. The receivers 47, 52 provide two-way elastically averaged alignment of the first alignment portion 34 and the second alignment portion 36, including fore/aft alignment to improve the uniformity of the gap between the components, although it will be understood that seating the first alignment portions 34 and second alignment portions 36 will also provide cross-car alignment and positioning and improved flushness of the outer surfaces of the components. In one embodiment, a receiver 53 (or a plurality of receivers 53) includes a slot comprising an elongated non-circular cross-section having a major diameter or length (not separately labeled) that extends along a substantially transverse or angled axis 59 of first alignment portion 34 that extends substantially perpendicular to longitudinal axis 54. The combination of receivers 47, 52 and 53 provide four-way elastically averaged alignment of the first alignment portion 34 and the second alignment portion 36. In other embodiments, the substantially transverse axis 59 may be angled at other acute or obtuse angles (not shown) while still providing four-way elastically averaged alignment of the first alignment portion 34 and the second alignment portion 36. Each receiver 47, 52, and 53 includes a corresponding chamfered edge (not separately labeled) that forms flared or tapered apertures 55, 56 and 57. In one embodiment, the tapered apertures 55, 56 and 57 comprise elongated slots. Flared or tapered apertures 55, 56 and 57 facilitate a lead-in for engagement and connection with second alignment portion 36 as will be detailed more fully below. First alignment portion 34 is also shown to include a first plurality of first elastically deformable alignment elements indicated generally at 60. The plurality of first elastically deformable alignment elements 60 are shown in the form of elastically deformable tooth elements 61 disposed on a second surface 41 having a first angled surface 64 and a second angled surface 66. In one embodiment, the deformable tooth elements 61 have their tips or vertices 62 and roots 63 (e.g. FIGS. 3 and 8) that extend substantially transverse to the longitudinal axis 54. In one embodiment, the tooth elements 61 have tooth axes 58 defined by the vertices 62 that extend substantially parallel to the transverse axis 59; however, other embodiments where the tooth elements 61 extend substantially transverse but not parallel to the transverse axis 59 may also be employed.

Second alignment portion 36 includes a body 76 having a first surface 78 and an opposing second surface 79. Second alignment portion 36 also includes a plurality of spaced apart elastically deformable alignment members 82-84. In one embodiment, elastically deformable alignment member 82 is shown in the form of an elastically deformable tube member 85 configured and disposed to be received and elastically deformed by hollow interior 51 of receiver 47. That is, the diameter of the deformable tube member 85 is greater than the width of the hollow interior 51 of the receiver 47 such that upon insertion of the tube member 85 into and through the flared opening 55, the width of the hollow interior 51 of receiver 47 interferes with the tube member 85 and causes it to be elastically deformed. Tube member 85 extends from a first end section 88 that projects from second surface 79 to a second end section 89 through a hollow intermediate section 91 having a generally circular cross-section. Tube member 85 may be guided into receiver 47 by flared opening 55 and the associated tapered sidewall of the receiver 47 acting as a lead-in surface. Similarly, elastically deformable alignment members 83, 84 take the form of corresponding tube members 92 and 93 that are received by receivers 52 and 53 respectively in the same manner as tube member 85. The alignment members 44-46 may be configured for engagement with elastically deformable alignment members 82-84 in the manner set forth in U.S. patent application Ser. No. 13/187,675 filed on Jul. 21, 2011 and Ser. No. 13/571,030 filed on Aug. 9, 2012, which are assigned to the same assignee as this application, and which are incorporated herein by reference in their entirety. Second alignment portion 36 is further shown to include a plurality of second elastically deformable alignment elements indicated generally at 94. Second elastically deformable alignment elements 94 are shown in the form of elastically deformable tooth elements 95 including a first angled surface 96 and a second angled surface 98. In one embodiment, the deformable tooth elements 95 have their tips or vertices 97 and roots 99 that extend substantially transverse to the longitudinal axis 54, FIG. 8. Deformable tooth elements 95 are configured for deformable mating engagement with elastically deformable tooth elements 61, as described herein, and will generally extend parallel to elastically deformable tooth elements 61. In one embodiment, the angles of the angled surfaces of first deformable tooth elements 61 and second deformable tooth elements 95 will be selected to complement one another and provide for the mating engagement of the elements and their angled surfaces. Elastically deformable alignment members 82-84 may also be spaced apart in any suitable pattern or arrangement that corresponds to alignment members 44-46, including as a linear array along longitudinal axis 81 as shown in FIG. 4, for example In accordance with an exemplary embodiment, second alignment portion 36 is disposed on a peripheral flange 24 of first body panel 4 and the first alignment portion 34 is disposed on an inner surface (not shown) of the fascia panel 10. It will be understood; however, that in other embodiments the first alignment portion 34 may be disposed on the first body panel and the second alignment portion 36 may be disposed on the fascia panel, for example. The alignment portions may be disposed on their respective panels in any suitable manner, including by being integrally formed with the panel, or by being formed or molded separately on the panel, or by being formed separately and attached to the panel, with integral formation with the panel being preferred. The alignment portions may be made out of any suitable elastically deformable material, and in many embodiments may be formed from the same material as the components on which they are disposed, including various metals, thermoset polymers, thermoplastic polymers, or composite materials, or a combination thereof.

Figure 5A:
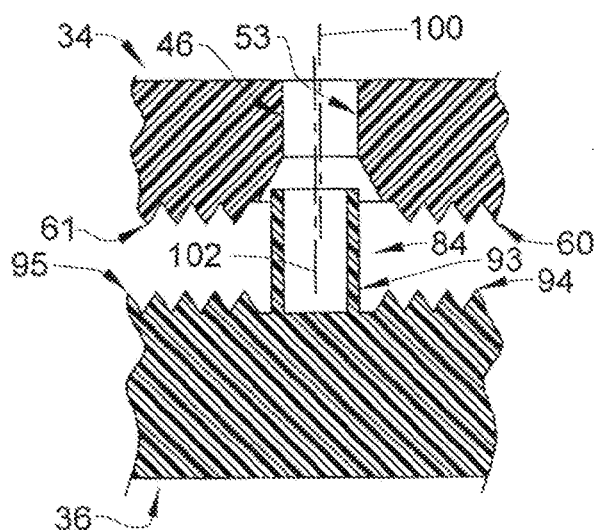
FIG. 5A is a cross-sectional view of an alignment member prior to engagement with an elastically deformable alignment member and illustrating the method of alignment including aligning an alignment member provided on a first alignment portion attached to the first component with an elastically deformable alignment member provided on a second alignment portion attached to the second component.
Figure 5B:
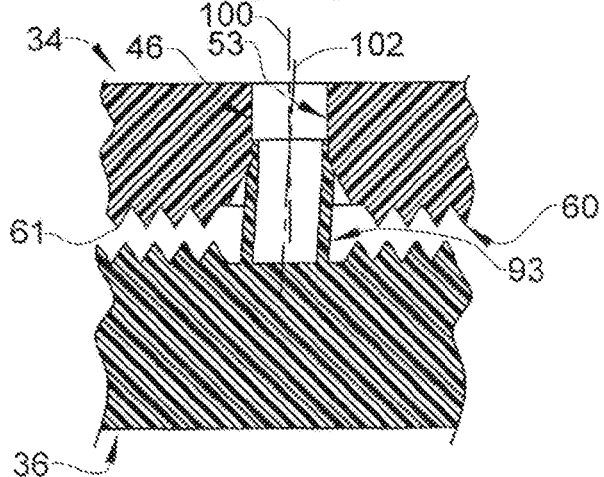
FIG. 5B is a cross-sectional view of the alignment member engaging and elastically deforming the elastically deformable alignment member to establish an elastically averaged coarse alignment of the components and illustrating the method of alignment including engaging the alignment member with the elastically deformable alignment member to establish an elastically averaged first (coarse) alignment of the first component relative to the second component.
Figure 5C:
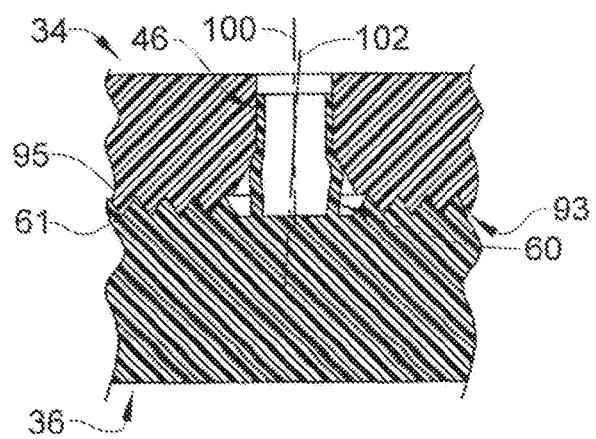
FIG. 5C is a cross-sectional view of the first plurality of elastically deformable alignment elements and the second plurality of elastically deformable alignment elements elastically averaging a predetermined position of the second alignment portion relative to the first alignment portion and illustrating the method of alignment including seating the first plurality of elastically deformable alignment elements against the second plurality of elastically deformable alignment elements to establish a second (fine) alignment of the first component relative to the second component and an elastically averaged predetermined position of the first component to the second component.

Fascia panel 10 is aligned with first body panel 4 such that tube members 85, 92, and 93 align with corresponding ones of alignment members 44, 45 and 46 as shown in FIGS. 5A and 6. As shown in FIGS. 5B, 5C and 7, tube members 85, 92 and 93 are inserted into corresponding ones of alignment members 44, 45 and 46 where they elastically deform as the receivers engage the tubes and are moved axially along the outer surfaces of the tubes toward the second elastically deformable alignment elements 94 to seat on the tube members by application of an axial force to establish a first or coarse alignment of first alignment portions 34 and fascia panel 10 and second alignment portions 36 and first body panel 4. Once the members are seated into the receivers sufficiently for the first deformable tooth elements 61 to engage the second deformable tooth elements 95, the second body panel 8 is shifted relative to first body panel 4 as the vertices (tips) of one or both of the tooth elements are elastically deformed (FIG. 8) and the energy associated with the elastic deformation as the tooth elements are axially pressed into one another causes the opposing angled surfaces to slide over (axially (up/down) and transversely toward the tooth roots) one another until the vertices/roots of the tooth elements are engaged with one another to establish a final or fine alignment as shown in FIG. 7.

More specifically, first alignment portion 34 may be shifted along longitudinal axis 54 and the axis substantially perpendicular to longitudinal axis 54. When shifted, elastically deformable alignment members 82, 83 and 84 also shift and/or elastically deform within corresponding ones of alignment members 44, 45 and 46 as the first plurality of elastically deformable alignment elements 60 engage and interact with the second plurality of elastically deformable alignment elements 94. The elastically deformable alignment members 82, 83 and 84, particularly as hollow tube members 85, 92 and 93, are not only elastically deformed (i.e., compressed) around their periphery as they are inserted into the receivers 47, 52 and 53, but they may also be axially elastically deformed (i.e. deflected) in bending along their length, acting as cantilevered beams, to provide elastic averaging and a coarse alignment of the first alignment portions 34 and the second alignment portions 36. Bending may occur due to the longitudinal axes 100 of the alignment members 42-44 (i.e., receivers 47, 52 and 53) not being coincident with the longitudinal axes 102 of the elastically deformable alignment members 82, 83 and 84 as shown in FIGS. 5A-5C and 7. As the engagement of the elastically deformable alignment members 82, 83 and 84 and receivers 47, 52 and 53 proceeds, the engagement of the first elastically deformable tooth elements 61 and second elastically deformable tooth elements 95 begins. The first elastically deformable tooth elements 61 shift across and/or along first angled surfaces 96 or second angled surfaces 98 of second elastically deformable tooth elements 95. Likewise, second elastically deformable tooth elements 95 shift across and/or along first angled surfaces 64 or second angled surfaces 66 of the first elastically deformable tooth elements 61 until the vertices of one of first elastically deformable tooth elements 61 or second elastically deformable tooth elements 95 are axially opposing the roots of the other. The seated inter-engagement of the plurality of first elastically deformable alignment elements 60 and second elastically deformable alignment elements 94 establishes an elastically averaged predetermined position of the components with which they are associated, including in the illustrated embodiment a predetermined position (FIGS. 1 and 7) of the fascia panel 10 relative to first body panel 6 to achieve a desired fit and finish for vehicle 2. Once finally aligned in the predetermined position, the components may be fixed to one another in any suitable manner using any suitable attachment device or mechanism. In one embodiment, mechanical fasteners, such as, for example, screws 100 and 102 may be passed through first and second alignment portions 34 and 36 to secure fascia panel 10 to peripheral flange 24, FIG. 7. Alternatively, other attachment devices or mechanisms may include various welds, adhesives, heat stakes and the like.

At this point it should be understood that the exemplary embodiment or embodiments describe an elastically averaged alignment system including first and second alignment portions 34, 36 that are aligned, engaged and subsequently adjusted and seated to establish an elastically averaged predetermined or final position. The elastically averaged final position leads to a desired fit and finish between adjacent components, such as a fit and finish defined by a predetermined flushness and gap or spacing between the components. It should also be understood that while shown and illustrated in conjunction with the body panels on a vehicle, the alignment system can be employed in a wide range of environments as described herein. It should also be understood that the first and second alignment portions may be constructed from a wide range of materials that allow for the elastically deformation of the elastically deformable alignment members as well as the shifting, inter-engagement and holding of the elastically deformable alignment elements.

Any suitable elastically deformable material may be used for the elastically averaged alignment system 30 including first and second alignment portions 34, 36, particularly those materials that are elastically deformable when formed into the features described herein. This includes various metals, polymers, ceramics, inorganic materials or glasses, or composites of any of the aforementioned materials, or any other combinations thereof. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically averaged alignment system 30 including first and second alignment portions 34, 36, may be formed in any suitable manner. They may be integrally formed or manufactured with the first component, or they may formed together separately and attached to the first component, or they may both be formed entirely separately and attached to the first component. When formed separately, they may be formed from different materials than those of the first component to provide a predetermined elastic response characteristic, for example. The material, or materials, may be selected to provide a predetermined elastic response characteristic of any or all of the first component or the second component. The predetermined elastic response characteristic may include, for example, a predetermined elastic modulus.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaged alignment system, comprising:
a first alignment portion comprising an alignment member and a first plurality of elastically deformable alignment elements, wherein the alignment member comprises an aperture formed in the first alignment portion; and
a second alignment portion comprising an elastically deformable alignment member configured and disposed to be received by and deformably and matingly engaged with the alignment member and a second plurality of elastically deformable alignment elements configured and disposed to deformably and matingly engage the first plurality of deformable alignment elements, wherein the engagement of the alignment member and deformable alignment member and first plurality of elastically deformable alignment elements and the second plurality of elastically deformable alignment elements elastically average a predetermined position of the second alignment portion relative to the first alignment portion,
wherein the elastically deformable alignment member comprises a deformable tube member extending substantially perpendicularly from the second alignment portion,
wherein the first plurality of elastically deformable alignment elements comprise a first plurality of elastically deformable tooth elements that extend along a plurality of tooth axes, the alignment member comprising a plurality of spaced apart elongated apertures having a length that is greater than a width.

2. The elastically averaged alignment system according to claim 1, wherein the alignment member and the elastically deformable alignment member collectively define an elastically averaged coarse alignment system.

3. The elastically averaged alignment system according to claim 2, wherein the first plurality and second plurality of elastically deformable alignment elements collectively define an elastically averaged fine alignment system.

4. The elastically averaged alignment system according to claim 1, wherein the second plurality of elastically deformable alignment elements comprise a second plurality of elastically deformable tooth elements that are configured for mating engagement with the first plurality of deformable tooth elements.

5. An elastically averaged alignment system, comprising:
a first alignment portion comprising an alignment member and a first plurality of elastically deformable alignment elements, wherein the alignment member comprises an aperture formed in the first alignment portion; and
a second alignment portion comprising an elastically deformable alignment member configured and disposed to be received by and deformably and matingly engaged with the alignment member and a second plurality of elastically deformable alignment elements configured and disposed to deformably and matingly engage the first plurality of deformable alignment elements, wherein the engagement of the alignment member and deformable alignment member and first plurality of elastically deformable alignment elements and the second plurality of elastically deformable alignment elements elastically average a predetermined position of the second alignment portion relative to the first alignment portion,
wherein the first plurality of elastically deformable alignment elements comprise a first plurality of elastically deformable tooth elements that extend along a plurality of tooth axes,
wherein the alignment member comprises a plurality of spaced apart elongated apertures having a length that is greater than a width,
wherein the plurality of spaced apart elongated apertures comprise a plurality of first slots having first longitudinal axes that are parallel to one another and not parallel to the tooth axes and a plurality of second slots having second longitudinal axes that are parallel to one another and that are not parallel to the first longitudinal axes.

6. An elastically averaged alignment system, comprising:

a first alignment portion comprising an alignment member and a first plurality of elastically deformable alignment elements, wherein the alignment member comprises an aperture formed in the first alignment portion; and a second alignment portion comprising an elastically deformable alignment member configured and disposed to be received by and deformably and matingly engaged with the alignment member and a second plurality of elastically deformable alignment elements configured and disposed to deformably and matingly engage the first plurality of deformable alignment elements, wherein the engagement of the alignment member and deformable alignment member and first plurality of elastically deformable alignment elements and the second plurality of elastically deformable alignment elements elastically average a predetermined position of the second alignment portion relative to the first alignment portion, wherein the elastically deformable alignment member comprises a deformable tube member extending substantially perpendicularly from the second alignment portion, wherein the aperture includes a chamfered edge forming a flared opening.

* * * * *